July 16, 1963

C. D. WILLSON 3,097,876

FAMILY CAR ENSEMBLES

Filed Nov. 15, 1961

INVENTOR
Corwin D. Willson

INVENTOR
Corwin D. Willson

United States Patent Office 3,097,876
Patented July 16, 1963

3,097,876
FAMILY CAR ENSEMBLES
Corwin D. Willson, 525 Goldengate St.,
Lake Orion, Mich.
Filed Nov. 15, 1961, Ser. No. 152,593
6 Claims. (Cl. 296—23)

This invention relates to ensembles making the family type automobile more homelike, useful and comfortable both on and off the highway. This application is a continuation in part of co-pending application Ser. No. 744,-419, filed June 25, 1958, and since matured as Pat. No. 3,058,769 and hereinafter referred to as the "parent patent" wherein the universally accepted three passenger back seat was changed to a two-passenger backseat in order to make room for the fore-and-aft length of a dresser against the left-hand wall of the passenger compartment directly behind the driving seat, the dresser extending around one back corner of the compartment in car bodies of sedan type.

Herein dinette features are primary and emphasis is placed on an ensemble in a passenger compartment seating not fewer than six passengers, of whom a maximum of three are in the same transverse vertical plane, meaning one at right angles with the longitudinal center axis of the body. These six passengers are seated fore and aft in transverse groups as in family cars of coach, sedan and station wagon types. The principal object of the invention is a family car ensemble made up of dinette components that seat 5–6 passengers on three sides of a tabletop having a fourth side secured demountably to the body.

Another object of the invention is a family car ensemble that includes seats for several passengers around meeting sides of a tabletop, one of the seats being temporary and formed from a component of a driver's seat facing driving controls: the seat-back of the driver's seat being pivotally mounted to be backwardly leveled alongside one of said meeting sides.

Another object of the invention is a family car ensemble comprising a dinette seating passengers around three sides of a demountable tabletop and including a temporarily rearward-facing foreseat.

Another object of the invention is a family car ensemble made up of components that include a dresser extending crosswise of the body and a dinette seating passengers around a corner of a tabletop, one of the passengers being supported on the temporarily leveled seat-back of a driver's seat, and another of the passengers being supported on a seat having a seat-back reversible to face the dresser.

Another object of the invention is a family car ensemble made up of components of a driver's seat and of a dinette, the components being convertible to form a double berth next to one side of the passenger compartment and to form a single berth next to the opposite side of the compartment.

These and other novel features and objects of the invention making cars of family type more domestically useful are hereinafter more fully described and claimed, and the preferred form of my family car ensemble is shown in the accompanying drawings, in which:

FIG. 1 is a floor plan of the sole passenger compartment of a family car body seating fore and aft six passengers, three thereof in a conventional single backseat and the other three in two separate front seats of which one faces driving controls to seat a driver only and the other is a double seat having a reversible seat-back temporarily rearward-facing.

FIG. 2 shows the same compartment housing the same front seat components as FIG. 1, the double foreseat facing one side of a demountable tabletop, and the seat-back of the driver's seat being backwardly leveled alongside the tabletop to form a temporary dinette seat between the bottom cushion of the driver's seat and the bottom cushion of a backseat, the last three components together making up a single berth extending along the left-hand side of the body.

Figure 3:
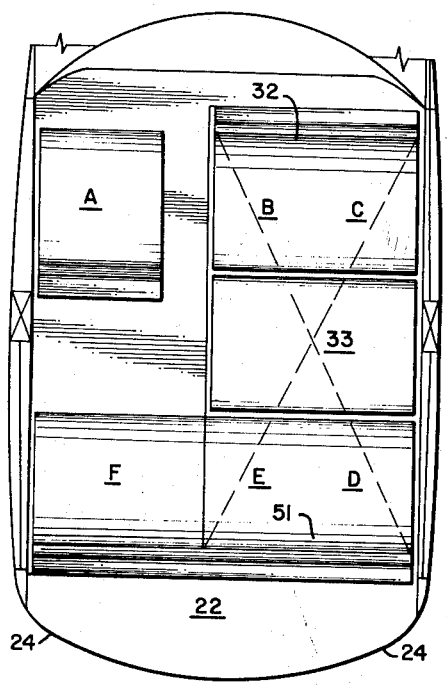
FIG. 3 shows the seating components of FIG. 1 in the same compartment and the tabletop demounted and turned over to extend soft-side up between the spaced bottom cushions of the dinette foreseat and the dinette backseat to form a double berth extending next to the right-hand side of the body.
Figure 6:
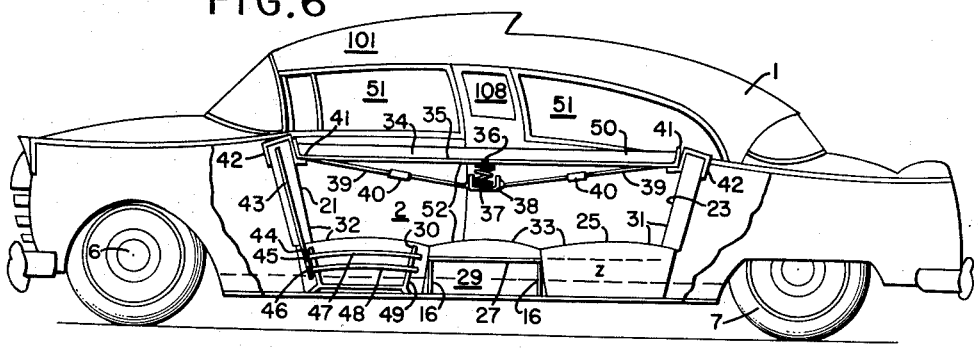

FIG. 6 is another sideview of the body and shows the right-hand side of the interior of the passenger compartment as shown in plan in FIG. 3 with the tabletop supported soft-side up between the bottom cushions of the face-to-face dinette foreseat and backseat to form a double berth, and an upper berth supported by and between the upwardly diverging interiorly stiffened seat-backs or back cushions of the dinette seats.

Figure 7:
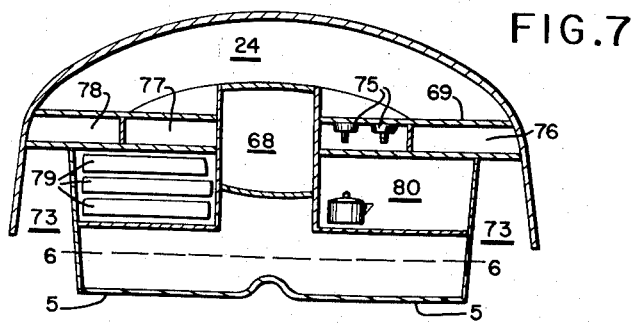

FIG. 7 is a cross-section of the passenger compartment facing the dresser and shows the storage enclosures and the worktop extending below the rearview window.

As the drawings demonstrate, the preferred form of family car housing the ensemble to be described is the sedan having two, three or four doors. Opposite long sides of body 1 have doors 2 of which the bottoms 3 extend slightly below the topside level of contiguous bottom frame members 4 which may be parts of the unit frame of the body. Floor or topside 5 of the compartment bottom extends near the bottom side of frame member 4 to bring the level of floor 5 below the axes 6 of fore and aft pairs of roadwheels 7 and the invention adapts the components of the domestic ensemble to the limited space available in family cars of modern low-slung types. Backseat 9 for three passengers rests on floor 5 and transmission housing 10 and driveshaft tunnel 11 protrudes abruptly up between the general level of floor 5 on opposite sides of tunnel 11. Where the prime mover is at the rear end of the body, an upward protrusion similar to tunnel 11 may constitute the backbone of my Patents Nos. 2,346,123 and 2,525,988, or a housing for controls running to a backend power-drive unit, or a duct conveying waste heat from the backend engine to the front of the passenger compartment. Thus tunnel or housing 11, for any of the uses mentioned, is shown in the drawings extending fore-and-aft in the lengthwise center axis C—C or parallel to and spaced from this axis to free the footspace and legroom of all passengers from the limitations imposed by the increasing upward protrusion of housing or tunnel 11.

Figure 1:
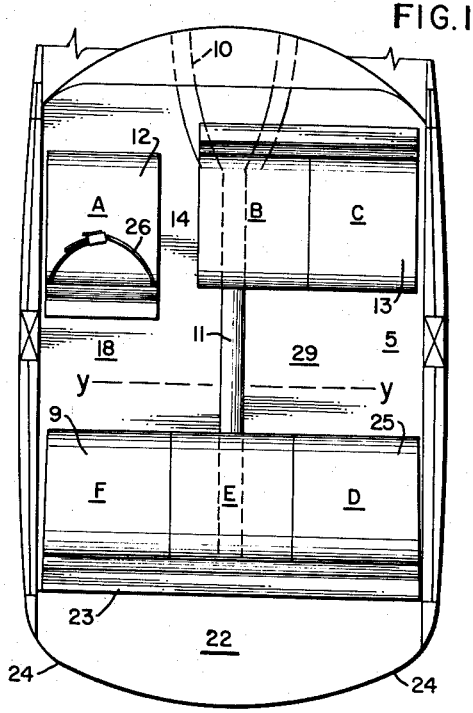
Figure 2:
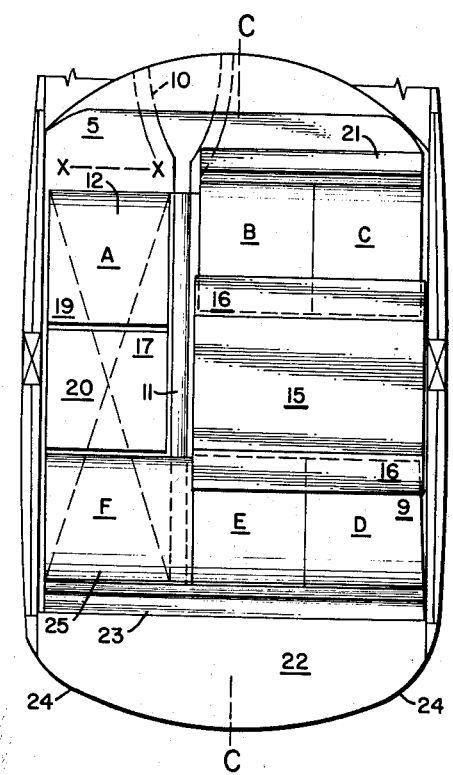
Figure 4:
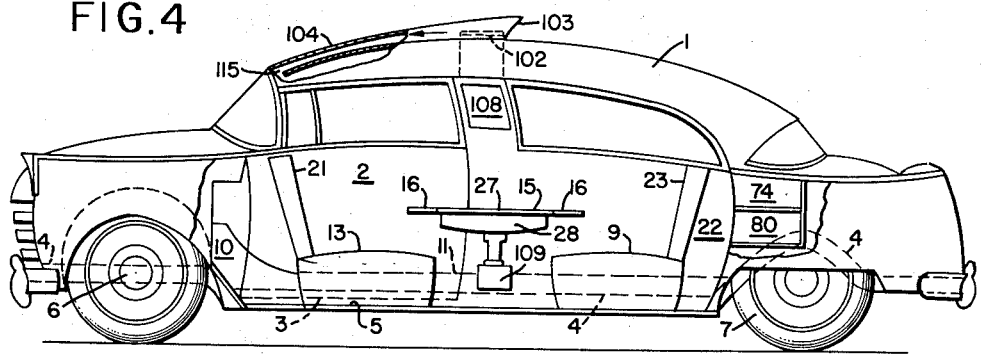
FIG. 4 is a sideview of the car body and shows the right-hand side of the interior of the passenger compartment and the dinette components of FIG. 2 ahead of the dresser extending across the back end of the compartment.

Next to the forward left-hand side of the passenger compartment, an individually fore-and-aft shiftable single seat 12 accommodates driver A and a double foreseat 13 next to the forward opposite side of the compartment accommodates passengers B and C temporarily rearward-facing. Passengers D, E and F occupy forward-facing backseat 9. In times of dangerous traffic, the rearward-facing of foreseat passengers B and C enhances their safety since the entire length of their spines is protected from collision injury and they cannot be pitched forward and through the glass windshield. Rearward-facing passenger B's footspace problem is largely removed since, instead of the broader and higher upward projection of transmission housing 10 lessening his foot-room when forward-facing, he can easily straddle upward protrusion 11 rearward of foreseat 13 in FIG. 1. The provision of a narrow passage or gap 14 between seats 12 and 13 makes the exchange of passenger positions fore and aft possible without leaving the car. Where the transverse width of the seating space accorded each passenger varies from 18 to 22 inches, it is obvious that today's stock sedan type family car body having an outside width of 6½ feet provides room for gap 14 when seating a maximum of three passengers in the same transverse vertical foreplane. When the car is in motion, tabletop 15 having dropleaves 16 may be demountably set up, as seen in FIGS. 2 and 4, between the aftpair of passengers D and E in forward-facing backseat 9 and forepair of passengers B and C in temporarily rearward-facing foreseat 13. If, when car is not in motion, driver A and backseat passenger F wish to join passengers B, C, D and E at table 15, seat 12 is pushed back from line x—x of FIG. 2 and seat-back or back cushion 17 of seat 12 is swung backward and downwardly leveled to fill space 18 between the bottom cushion 19 of seat 12 and the forward-facing seating for passenger F. Thereupon both driver A and passenger F may occupy the temporary seat thus formed alongside tabletop 15. Together, bottom cushion 19 and leveled seat-back 17 and the forward-facing seating for passenger F make up a forward-facing chaise longue or single berth 20 for a single adult passenger next to the left-hand side of body 1 when the car is parked.

Figure 5:
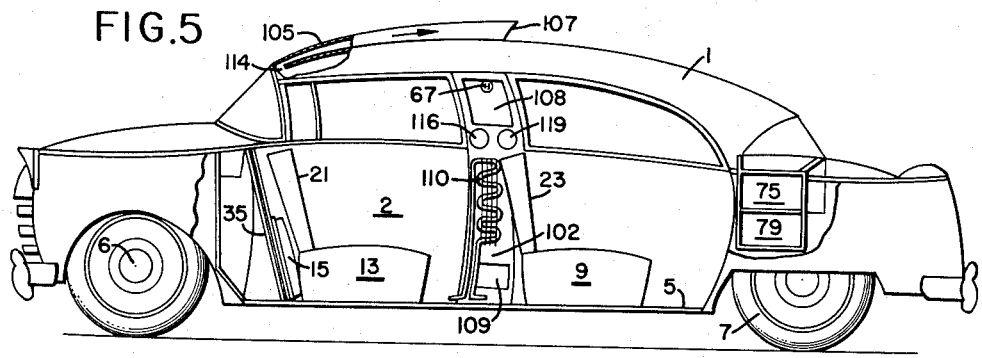
FIG. 5 is another sideview of the body and shows the right-hand side of the passenger compartment interior as in FIG. 2 except that the demounted tabletop is stored forwardly of the rearward-facing seat-back of the double foreseat and the dinette backseat is shifted forwardly and its seat-back reversed to rearwardly face, and bring the seat occupants within manual reach of the dresser.

When seat-back or back cushion 21 of foreseat 13 is swung to be forward-facing and tabletop 15 is demounted, its storage is necessary. Enclosure 22 extends from one side to the opposite side of body 1 and from seat-back or back cushion 23 of forwardly-facing backseat 9 rearwardly to just below rearview window 24 seat-back 23 constituting a closure for the front side of enclosure 22 which may take the form, in part, of an interiorly divided work cabinet or dresser as hereinafter described. Since such a closure must be readily opened, seat-back 23 is mounted to be swung forwardly across bottom cushion 25 of seat 9. To enhance the safety of back-seat passengers D, E and F, seat 9 is made convertibly to face rearwardly as seen in FIG. 5. This raises the problem of adequate legroom for rearward-facing passengers D, E and F without unduly increasing the length of the passenger compartment. Added legroom for passengers D, E and F is secured by shifting seat 9 or any division of seat 9 shown in FIG. 2 forwardly to line y—y of FIG. 1. With forward-facing driver A secured to seat 12 by safety-belt 26 and passengers B, C, D, E, and F all rearward facing, optimum conditions are provided for escape from injury and death in a head-on collision tending to pitch forward-facing passengers violently forward. When demounted, tabletop is stored either in an enclosure 22, walled by seat-back 23 or, as shown in FIG. 5 in an enclosure ahead of and walled by seat-back 21.

Today's cars persist in neglecting the need for safe horizontal relaxation in travel when the car is in rapid motion. The underside of rigid central top portion 27 of tabletop 15 comprises or holds a resilient cushion or upholstering 28 that makes the underside of tabletop 15 soft. Turn tabletop 15 when demounted soft-side up and it fills the space 29 between rearward-facing foreseat 13 and forward-facing backseat 9 and the top surface of soft cushion 28 is supported at approximately the same general level, as seen in FIG. 6, as the tops of bottom cushion 25 of backseat 9 and bottom cushion 30 of foreseat 13. This makes up either a forward-facing chaise-longue 31 or a rearward-facing chaise-longue 32 but preferably a double berth 33 extending next to the right-hand side of body 1. If the sleeping accommodations need increasing, a demountable upper berth 34 of hard and soft parts is set up above lower berth 33. The hard parts include bed-platform 35 suspended on and between the tops of seatbacks 21 and 23 and made up of sections of plywood fixed together with central hinge 36 extending from one side of platform 35 to the opposite side thereof and permitting vertical displacements between parts of platform 35 on opposite fore-and-aft sides of hinge 36, such displacements being yieldingly resisted by springs 37 in holder 38 suspended by taut braces 39 fixed to turnbuckles 40 attached to opposite ends 41 of platform 35, ends 41 including hangers 42 hooked or caught over tops of seatbacks 21 and 23 or caught into integral frameworks 43 of back cushions 21 and 23, downward side lengths 44 of frames 43 each carrying two prongs 45, 46 sliding in curved grooves 47, 48 housed in end-plates or lower frames 49 of bottom cushions 25, 30, and concentric with top contours of the bottom cushions. A slight deviation from concentricity at opposite ends of grooves 47, 48 will tend to pinch prongs 45, 46 to hold them temporarily locked in either forward-facing or rearward-facing positions. One of the soft components of upper berth 34 is an inflatable air mattress 50 which, when inflated, is supported on platform 35 alongside windows 51 in the side of the passenger compartment. Upper and lower berths and their components hard and soft are referred to collectively as "a sleeping unit," and it will be noted that this unit 52 is supported as a whole on floor or topside 5 of the compartment bottom. For bedding, hollow bottoms of seats 9 and 13 may be utilized for storage and other bedding and the demounted hard and soft parts of upper berth 34 may be stored in the same enclosures with tabletop 15 or elsewhere in or on body 1. Since the cost of accommodating a family for a single night at a hotel or motel may exceed the actual cost of the sleeping arrangements herein described, it is apparent that cheaper travel waits on the family car itself better sheltering family mobility on and off the highway as the invention teaches.

In FIG. 2 transversely off-center upward protrusion 11 may bottom a fore- and aft-passage that includes gap 14 and transversely off-center transmission housing 10 may be connected in a manner not shown to the main shaft of the prime mover as by a gear-train and the transversely off-center drive shaft tunnel 11 may extend from housing 10 through bottom of enclosure 22. When car is parked electric outlet 67 may be connected with a roadside parking pay-as-you-use-it electric current source to operate television set 68 housed in one of the specialized subdivisions of transverse enclosure 22 that alternately may house radio, phonograph or record changer and these audio or video means of entertainment may serve to induce passengers to ride backward-facing in times of unusually dangerous traffic as at the ends of weekend or holiday vacation periods. Or television set 68 may be supported by worktop 69 of enclosure 22, the subdivisions of which may merely make accessible in the passenger compartment the impedimenta of travel today packed in containers for storage in the car trunk or on the top of the body.

In my earlier applications of which one matured as Pat. No. 2,638,374 enclosure 22 was made up of components of which many herein have been discarded to widen the view of backward-facing passengers. Herein enclosure 22 may be little more than a forward part of the trunk space made accessible to occupants of the passenger compartment by the forward shifting of seat 9 and reversing of seat-back 23. On the other hand it may comprise a variety of highly specialized components, some of which have been mentioned. Just as the buyer of a new water cruiser is delighted to find a galley provided, so the buyer of a more mature motorcar will not waste time shuddering over enclosure 22 housing facilities catering to his family's more basic biological requirements, especially where neither the exterior nor interior appearance of the car is noticeably altered.

FIG. 7 shows enclosure 22 extending between opposite wheelwells 73 of aftwheels 7. Worktop 69 above the subdivided parts of enclosure 22, including television enclosure 68, may together take up the entire back end of the passenger compartment below rearview window 24. In place of enclosure 68 being occupied by television the same space may house cold food storage cabinet 74 on one side of which cookstove 75 is hidden under a removable part of worktop 69 next to drawer 76 and lavatory or sink 77 is hidden under another removable part of worktop 69 beside drawer 78. Other divisions of dresser 22 such as 79 provide space for bedding and 80 space for utensils. Whether television set 68 is built into dresser 22 or rests on worktop 69 it is within view of all rearward-facing passengers. In place of the housekeeping facilities described, those better meeting the needs of a lady's boudoir or those of a newsman or writer, such as a typewriter, tape recorder, letter file, bookshelves and the like may occupy the subdivisions of enclosure 22.

With the provision of means for prolonged occupancy by so many passengers of such a relatively small volume of space enclosed by body 1 when parked or in motion at all seasons, an improved system of ventilation is necessary. Conventional space heating of an automobile body may be impractical when seat-back 21 is rearward-facing and blocks heated air flowing rearwardly from a heater under the right-hand side of the instrument panel or glove compartment. Here roof 101 houses between inner and outer coverings a system of air-circulating ducts including inverted U-shaped duct 102 extending across roof 101 between upright lengths of duct 102 in opposite sides of body 1 immediately rearward of doors 2. Forehalf of roof 101 has a gradual upward and backward slant terminating in an abrupt downward step 103 at the back ends of a pair of ducts 104, 105 which extend lengthwise in the top of body 1. Downward step 103 makes a "comb" extending right across the body and passage of air rearwardly over fore-half of roof 101 creates a drop in pressure immediately behind step 103 which causes suction on the duct system through openings 107 backwardly opening in comb 103. In opposite sides of interior of body 1, upper grilled opening closures 108 and lower grilled open closures (registers) 109 open into the upright legs of duct 102. Intermediate between registers 108 and 109 and within duct 102 is a finned heat exchanger 110 having inflow and outflow pipes connected with the engine cooling-water system whereby hot water is circulated in heat-exchanger 110 while air is flowing upward in duct 102 from opening 109 through fins of heat exchanger and from opening 108. By dampers and baffles in the system of ducts, adjustable as to weather and season, forward motion of the body may draw air from the body through inlet 114 and duct 105 by means of suction on opening 107 while a flow of warmed air through duct 104 enters the fore-part of the passenger compartment by outlet 115 against the windshield to keep the frost therefrom. Airscoop 116 may draw fresh air into the duct system by the body's forward movement. Where body 1 is to be occupied when parked in cold weather, a fuel-fed combustion heater may be fitted into duct 102 near floor 5 and a hot-flue from the heater rising in duct 102 will itself become a heat-exchanger. A small electric motor-blower unit 119 near fresh air scoop 116 may draw air into the duct system when body 1 is parked and ingress of air thus forced into the body will cause a flow of air from the body through egress portions of the duct system described.

I have now described my family car ensemble as suited for types of cars that have won universal acceptance. By increasing passenger safety in dangerous traffic, by lessening the carowner's dependence away from home on food and shelter of unknown character, the invention places emphasis on greater utility without radical alterations in body types, including station wagons ahead of axes of aftwheels 7, that have proved most popular. Just as a cabin cruiser is safer because its structure concentrates the owner's attention on factors other than speed, so the land cruiser described herein is safer because of diverting the owner's attention from speed alone. With our nearly 75 million motor vehicles, we have become the most mobile peoples of these times. It is time we better sheltered our mobility. At a time when our car exports are falling and the import of foreign cars is increasing, it is time to inquire the reason. This invention accepts the proven formula for growth: sensible and inventive adaptation to swiftly changing needs. With growing leisure, the family car must become more homelike and this invention points the way.

The drawings, being illustrative only, are more or less diagrammatic in character to show the preferred relation of the parts and it will be understood that changes may be made in various parts without vitally altering the character of the whole or departing from the spirit and scope of the invention as set forth in the appended claims; and all changes which come within the meaning and range of equivalency of the claims are therefore intended to be embraced therein.

Having thus broadly defined and fully described my invention, its utility in motion and at rest, its domestic character, its versatile structure, mode of conversion and use, what I claim and desire to secure by Letters Patent of the United States is:

1. A family car ensemble within the sole compartment to receive passengers inside a motorcar body, the compartment seating a minimum of five passengers and a maximum of three of said passengers in the same transverse vertical plane: the ensemble ahead of aftwheels supporting the body comprising a driving seat facing driving controls and a family dinette for five passengers and made up of a rearward-facing double seat extending for substantially its full width along one side of a four sided tabletop having a second side demountably secured to one wall of the compartment, and a forward facing seat extending across the longitudinal center axis of the body to face a third side of the tabletop, and said driving seat having a back cushion operatively mounted on a seat base to be backwardly and downwardly leveled to provide a seat along the fourth side of said tabletop.

2. A family car ensemble within the passenger compartment of an automobile body, driving controls in said compartment and said ensemble comprising a tabletop having one side secured demountably to the body and second and third sides extending in the longitudinal center axis of the body and a driver's seat facing said controls and having a seatback backwardly leveled to make up a temporary seat along the fourth side of said tabletop, and an aftseat having a bottom cushion extending right behind, and next to, and level with said temporary seat.

3. A family car ensemble within the passenger compartment of an automobile body, driving controls housed by the compartment and said ensemble comprising a tabletop and a driving seat facing said controls and having a seatback pivotally mounted on said seat to be swung backward and downward to make up a leveled temporary seat along one side of said tabletop which extends in the longitudinal center axis of the body and has the side opposite said temporary seat secured demountably to the body.

4. A family car ensemble within the passenger compartment of an automobile body, driving controls in said compartment and said ensemble comprising a driving seat facing said controls and components of a family dinette seating several passengers around two meeting sides of a tabletop having a third side secured demountably to the body, said driving seat having a seatback pivotally mounted on said seat to be swung backward and downwardly leveled along one of said two meeting sides of the tabletop to make up a temporary seat of said dinette, and the seating component along the other of said two meeting sides having a seatback reversible to face a group of housekeeping facilities including a worktop abutting the right-hand side of the body.

5. A family car ensemble within the passenger compartment of an automobile body, driving controls in said compartment and said ensemble comprising a family sitting-dining-sleeping unit made up of convertible components including dinette seats for 5–6 passengers on three sides of a table top having a fourth side secured demountably to the body, one of said components being a seatback of the driver's seat facing said controls, said seatback having means of being backwardly leveled to make up a temporary dinette seat alongside said tabletop.

6. The structure of claim 5 wherein said dinette seats spaced fore and aft in the longitudinal center axis of the body on opposite sides of said tabletop make up together a double berth next to one side of the compartment, and a seating component extends behind the backwardly-leveled seatback to make up therewith and with the balance of said driver's seat a single berth next to the opposite side of the compartment.

References Cited in the file of this patent

UNITED STATES PATENTS

| | | |
|---|---|---|
| D. 159,326 | Eldridge | July 18, 1950 |
| 1,163,056 | Zimmerman | Dec. 7, 1915 |
| 1,190,441 | Marsh | July 11, 1916 |
| 1,196,908 | Walker | Sept. 5, 1916 |
| 1,387,911 | Shefts | Aug. 16, 1921 |
| 1,397,594 | Moses | Nov. 22, 1921 |
| 1,533,354 | Stahl | Apr. 14, 1925 |
| 1,658,110 | Warren | Feb. 7, 1928 |
| 1,716,316 | Lanning | June 4, 1929 |
| 1,734,213 | Jones | Nov. 5, 1929 |

FOREIGN PATENTS

| | | |
|---|---|---|
| 656,742 | France | Jan. 5, 1929 |

OTHER REFERENCES

A "Motorlounge," article in "The Autocar" of December 18, 1936, page 1212.